United States Patent
Miyazaki et al.

(10) Patent No.: US 9,902,389 B2
(45) Date of Patent: Feb. 27, 2018

(54) VEHICLE DRIVE CONTROL DEVICE

(75) Inventors: Terufumi Miyazaki, Toyota (JP);
Yukihiko Ideshio, Nisshin (JP);
Toshihiko Kamiya, Toyota (JP);
Shingo Eto, Gamagori (KR); Hironori Asaoka, Nisshin (JP); Yasuyuki Kato, Toyota (JP); Seigo Kanou, Anjo (JP);
Makoto Iwanaka, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 628 days.

(21) Appl. No.: 14/124,154

(22) PCT Filed: Jun. 6, 2011

(86) PCT No.: PCT/JP2011/062963
§ 371 (c)(1),
(2), (4) Date: Jan. 31, 2014

(87) PCT Pub. No.: WO2012/168998
PCT Pub. Date: Dec. 13, 2012

(65) Prior Publication Data
US 2014/0195135 A1    Jul. 10, 2014

(51) Int. Cl.
*B60W 10/06* (2006.01)
*B60W 10/02* (2006.01)
(Continued)

(52) U.S. Cl.
CPC ............ *B60W 10/06* (2013.01); *B60W 10/02*
(2013.01); *B60W 10/08* (2013.01); *B60W 10/10* (2013.01);
(Continued)

(58) Field of Classification Search
CPC .... F02D 11/105; F02D 41/107; F02D 11/104;
B60W 10/02; B60W 10/06; B60W 10/08;
(Continued)

(56) References Cited

U.S. PATENT DOCUMENTS 5,355,749 A * 10/1994 Obara ................... B60K 6/543
477/15
5,923,093 A *  7/1999 Tabata .................. B60K 6/365
290/40 C
(Continued)

FOREIGN PATENT DOCUMENTS

JP         62-061832      3/1987
JP      2000-324609 A    11/2000
(Continued)

*Primary Examiner* — Hung Q Nguyen
*Assistant Examiner* — Brian P Monahon
(74) *Attorney, Agent, or Firm* — Andrews Kurth Kenyon LLP (57) ABSTRACT

A vehicle drive control device performs acceleration/deceleration running by alternately repeating acceleration running and deceleration running, wherein it compares between an efficiency of the motor at a first operation point determined by a rotation speed and a torque of a motor and an efficiency of the motor at a second operation point for outputting a higher torque than the first operation point, and if a difference between the efficiencies is greater than a determination value, the acceleration running at the second operation point and the deceleration running being repeated, the second operation point being set a maximum efficiency line of the motor with the rotation speed and the torque of the motor as parameters to perform the acceleration running, and if acceleration during the acceleration running becomes larger than an acceleration limit value, a rotating machine acting at least as an electric generator generating electricity to charge a battery.

10 Claims, 4 Drawing Sheets

(51) Int. Cl.
  *B60W 10/08* (2006.01)
  *B60W 30/188* (2012.01)
  *B60W 10/10* (2012.01)
  *B60W 20/11* (2016.01)
  *B60W 30/18* (2012.01)
  *F02D 11/10* (2006.01)
  *F02D 41/10* (2006.01)

(52) U.S. Cl.
  CPC ........ *B60W 20/11* (2016.01); *B60W 30/1882* (2013.01); *F02D 11/105* (2013.01); *F02D 41/107* (2013.01); *B60W 2030/1809* (2013.01); *Y02T 10/52* (2013.01); *Y02T 10/6286* (2013.01)

(58) Field of Classification Search
  CPC .............. B60W 10/10; B60W 20/102; B60W 30/1882; B60W 2030/1809; Y02T 10/52; Y02T 10/6286
  See application file for complete search history.

(56) References Cited

U.S. PATENT DOCUMENTS

| | | | |
|---|---|---|---|
| 6,009,371 A * | 12/1999 | Kobayashi | B60K 6/445 123/339.19 |
| 6,201,312 B1 * | 3/2001 | Shioiri | B60K 6/365 290/40 A |
| 6,223,842 B1 * | 5/2001 | Masaki | B60K 6/387 180/65.23 |
| 6,329,775 B1 | 12/2001 | Matsubara et al. | |
| 6,336,446 B1 * | 1/2002 | Isobe | F02M 25/0809 123/198 D |
| 6,662,096 B2 * | 12/2003 | Komiyama | B60K 6/46 180/65.245 |
| 7,096,111 B2 * | 8/2006 | Birkner | F02D 41/38 123/480 |
| 7,789,795 B2 * | 9/2010 | McKenzie | F16H 37/0846 477/115 |
| 7,836,986 B1 * | 11/2010 | Gillecriosd | B60K 6/387 180/168 |
| 8,688,337 B2 * | 4/2014 | Takanami | B60W 10/06 180/65.28 |
| 2002/0062183 A1 * | 5/2002 | Yamaguchi | B60K 6/46 701/22 |
| 2002/0112901 A1 * | 8/2002 | Yamaguchi | B60K 6/365 180/65.235 |
| 2003/0191574 A1 * | 10/2003 | Kawai | B60K 6/48 701/70 |
| 2005/0247495 A1 * | 11/2005 | Tabata | B60K 6/365 180/65.235 |
| 2007/0233332 A1 * | 10/2007 | Kawada | B60K 6/365 701/13 |
| 2008/0093865 A1 * | 4/2008 | Komiyama | B60K 6/48 290/40 A |
| 2009/0030568 A1 * | 1/2009 | Amano | B60K 6/445 701/22 |
| 2009/0088914 A1 * | 4/2009 | Mizutani | B60K 1/02 701/22 |
| 2010/0056312 A1 * | 3/2010 | Akutsu | B60K 6/365 475/1 |
| 2010/0094493 A1 * | 4/2010 | Atsumi | B60W 20/15 701/22 |
| 2010/0100292 A1 * | 4/2010 | Lv | F02D 29/06 701/60 |
| 2010/0234171 A1 * | 9/2010 | Tanba | B60K 6/387 477/5 |
| 2010/0318278 A1 * | 12/2010 | Douglas | F02D 41/0002 701/103 |
| 2010/0324795 A1 * | 12/2010 | Tsumori | F02D 29/02 701/70 |
| 2011/0029178 A1 * | 2/2011 | Kawakami | G05B 13/026 701/22 |
| 2011/0130931 A1 * | 6/2011 | Yoshikawa | F16H 61/0213 701/55 |
| 2011/0320078 A1 * | 12/2011 | McGill | B60K 6/48 701/22 |
| 2012/0123624 A1 * | 5/2012 | Sato | B60L 7/14 701/22 |

FOREIGN PATENT DOCUMENTS

| | | |
|---|---|---|
| JP | 2001-054204 A | 2/2001 |
| JP | 2007-187090 A | 7/2007 |
| JP | 2010-006309 A | 1/2010 |
| JP | 2011-067043 A | 3/2011 |

* cited by examiner

FIG.3(a)
LARGE EFFICIENCY DIFFERENCE
(P&G RUNNING IS IMPLEMENTED)

FIG.3(b)
SMALL EFFICIENCY DIFFERENCE
(P&G RUNNING IS NOT IMPLEMENTED)

FIG.4(a)

ACTUATION STATE DURING P&G RUNNING

|  | ENGINE 12 | MG | CLUTCH 34 |
|---|---|---|---|
| PULSE RUNNING | OPERATED | FREE/ REGENERATIVE | ENGAGED |
| GLIDE RUNNING | STOPPED | FREE | RELEASED |

FIG.4(b)

TIME CHART

VEHICLE DRIVE CONTROL DEVICE

CROSS-REFERENCE TO RELATED APPLICATIONS

This is a national phase application based on the PCT International Patent Application No. PCT/JP2011/062963 filed on Jun. 6, 2011, the entire contents of which are incorporated herein by reference.

TECHNICAL FIELD

The present invention relates to a vehicle drive control device and particularly to improvement of a drive control device performing acceleration/deceleration running by alternately repeating acceleration running and deceleration running.

BACKGROUND ART

A vehicle drive control device is proposed that performs acceleration/deceleration running by alternately repeating acceleration running by operation of a motor and deceleration running by stopping of the motor or interruption of power transmission from the motor. A hybrid vehicle described in Patent Document 1 is an example thereof and the acceleration/deceleration running is performed during auto-cruise running in which an engine is used for running at a constant vehicle speed, on the condition that a predetermined prohibition condition is not satisfied such as that a fuel efficiency improvement effect is not sufficiently expected due to high cruise setting vehicle speed.

PRIOR ART DOCUMENT

Patent Document

Patent Document 1: Japanese Laid-Open Patent Publication No. 2007-187090

SUMMARY OF THE INVENTION

Problem to be Solved by the Invention

However, it is difficult to properly determine the fuel efficiency improvement effect of the acceleration/deceleration running only from the cruise setting vehicle speed and fuel efficiency may actually be deteriorated by implementation of the acceleration/deceleration running depending on an operation point of a motor. In other words, since the motor is activated and stopped and acceleration is periodically performed in the acceleration/deceleration running, the fuel efficiency may deteriorate as compared to steady running at substantially constant vehicle speed.

The present invention was conceived in view of the situations and it is therefore an object of the present invention to enable proper determination of whether a fuel efficiency improvement effect can be acquired by implementation of the acceleration/deceleration running, thereby further improving fuel efficiency.

Means for Solving the Problem

To achieve the object, the first aspect of the invention provides a vehicle drive control device performing acceleration/deceleration running by alternately repeating acceleration running by operation of a motor and deceleration running by stopping of the motor or interruption of power transmission from the motor, wherein (a) a comparison is made between an efficiency $\eta 1$ of the motor at a first operation point determined by a rotation speed and a torque of the motor during normal running while the motor is operated depending on an output request amount and an efficiency $\eta 2$ of the motor at a second operation point for outputting a higher torque than the first operation point, and wherein if a difference between the efficiencies is greater than a predetermined determination value, the acceleration running at the second operation point and the deceleration running are repeated, wherein (b) a maximum efficiency line of the motor is stored with the rotation speed and the torque of the motor as parameters in advance, and wherein the second operation point is set on the maximum efficiency line to perform the acceleration running, and wherein (c) a rotating machine acting at least as an electric generator is included in a power transmission path between the motor and wheels, and wherein if acceleration during the acceleration running becomes larger than a predetermined acceleration limit value, the rotating machine generates electricity to charge a battery.

The fourth aspect of the invention provides the vehicle drive control device recited in the third aspect of the invention, wherein the acceleration limit value is set by using a vehicle speed as a parameter so as to allow larger acceleration during lower vehicle speed as compared to during higher vehicle speed.

Effects of the Invention

In the vehicle drive control device as described above, a comparison is made between the efficiency $\eta 1$ at the first operation point during the normal running while the motor is operated depending on an output request amount and the efficiency $\eta 2$ at the second operation point for outputting a higher torque than the first operation point and, if the difference of these efficiencies is greater than the determination value, the acceleration/deceleration running is implemented such that the acceleration running is performed at the second operation point and, therefore, by suitably determining the determination value, the fuel efficiency can more certainly be improved through the implementation of the acceleration/deceleration running.

Since the motor is operated at the second operation point set on the maximum efficiency line to perform the acceleration running, the efficiency difference between the first operation point and the second operation point is maximized, increasing the frequency of implementation of the acceleration/deceleration running, and the excellent fuel efficiency improvement effect is acquired through the implementation of the acceleration/deceleration running.

If the acceleration during the acceleration running in execution of the acceleration/deceleration running becomes larger than the predetermined acceleration limit value, the rotating machine generates electricity to charge the battery so that the acceleration is prevented from increasing and, therefore, while a driver is prevented from feeling uncomfortable due to larger acceleration, the battery can be charged with excess motor output to maintain the fuel efficiency improvement effect. In other words, although the second operation point can be set such that the vehicle is accelerated at the predetermined acceleration during the acceleration running, if the motor is operated at the maximum efficiency line, the acceleration is likely to be larger than necessary and makes a driver feel uncomfortable and, therefore, the rotating machine generates electricity to charge the battery, thereby achieving both the prevention of the driver's uncomfortable feeling and the fuel efficiency improvement.

In the second aspect of the invention, the acceleration limit value is set by using the vehicle speed as a parameter so as to allow larger acceleration during lower vehicle speed as compared to during higher vehicle speed and, therefore, while a driver is prevented from feeling uncomfortable due to larger acceleration, an energy loss due to battery charge is suppressed, resulting in further improvement in the fuel efficiency. In other words, since the driver generally becomes less sensitive to the acceleration at lower vehicle speed as compared to higher vehicle speed, the driver is less likely to feel uncomfortable even if the acceleration is made larger during lower vehicle speed and, when higher acceleration is allowed, an energy loss generated during charging/discharging of the battery is reduced and the energy can be more efficiently and effectively utilized.

BRIEF DESCRIPTION OF THE DRAWINGS

FIG. 4 is a diagram for explaining pulse-and-glide running executed by the pulse-and-glide running means of FIG. 1.

MODE FOR CARRYING OUT THE INVENTION

The present invention is applicable to drive control devices of various vehicles such as hybrid vehicles of parallel type, series type, split type, etc., including a plurality of motors as drive power sources such as an engine and an electric motor, and an engine drive vehicle using only an engine as the drive power source for running, an electric vehicle using only an electric motor as the drive power source for running, and a fuel-cell electric vehicle including a fuel cell as an electric energy source, for example. In other words, the present invention is effective for various motors having efficiency varying depending on an operation point related to rotation speed and torque and, if a first operation point during normal running determined depending on an output request amount is located in an operation range of relatively poor efficiency, fuel efficiency (energy efficiency) can be improved by implementing acceleration/deceleration running.

Although the acceleration/deceleration running is implemented, for example, during steady running while a vehicle is running at a substantially constant vehicle speed, such as during auto-cruise running, so that the vehicle speed is changed between predetermined upper and lower limit vehicle speeds determined depending on the steady running vehicle speed (such as a cruise setting vehicle speed), the acceleration/deceleration running can be performed even during non-steady running while an output request amount such as an accelerator operation amount is changed, in such a manner that the upper and lower limit vehicle speeds are changed to follow a change in the output request amount. If a driver is likely to feel uncomfortable due to a stop etc., of an engine during running in an engine drive vehicle, the acceleration/deceleration running may be performed only during the auto-cruise running. The output request amount includes not only an output request amount from an accelerator operation of a driver but also an output request amount for automatically maintaining the cruise setting vehicle speed during the auto-cruise running.

In the acceleration running during the acceleration/deceleration running, a vehicle is accelerated by operating a motor at a second operation point of a higher torque as compared to a first operation point during normal running determined based on the output request amount. The second operation point is set on a maximum efficiency line. If the second operation point is set by increasing only the torque at the same rotation speed as that of the first operation point, a gear ratio of a power transmission path may not be changed; however, for example, in the case of a vehicle having a continuously variable transmission or a split type hybrid vehicle, the rotation speed of the motor can smoothly be changed and various forms can be implemented such as setting the second operation point having both the torque and the rotation speed of the motor different from the first operation point. If a stepped transmission is included, the acceleration/deceleration running accompanied by a gear change can also be performed.

The deceleration running during the acceleration/deceleration running may be performed in the case of inertia running with the motor stopped or in the case of inertia running with the motor retained in, for example, an idle state by interrupting power transmission with a connection/disconnection device. For example, if an engine is used as the motor, it is desirable to disconnect the engine from the power transmission path by the connection/disconnection device such as a clutch to prevent deceleration due to an engine brake. The stop of the motor means a stop of self-rotation due to a fuel cut etc., and does not necessarily means a rotation stop. If an electric motor is used as the motor, the stop of the motor means a free rotation state with zero torque.

In the present invention, for example, the acceleration/deceleration running is implemented if a difference ($\eta 2-\eta 1$) between efficiency $\eta 1$ at the first operation point and efficiency $\eta 2$ at the second operation point is greater than a predetermined positive determination value, and the determination value may be determined in advance as a constant value or may be set by using the rotation speed etc., of the motor as a parameter. The efficiency of the motor can be set in advance as a data map using the rotation speed and the torque as parameters, for example.

In the present invention, if the acceleration during the acceleration running becomes larger than the acceleration limit value, a rotating machine generates electricity to charge a battery. Although the rotating machine may have only the function of an electric generator, a motor generator also usable as an electric motor can be employed as well. When the present invention is implemented, for example, regenerative torque of the rotating machine can be controlled to increase and decrease such that the acceleration during the acceleration running becomes equal to or less than the acceleration limit value; however, electric generation may simply be performed with constant regeneration torque.

Although the acceleration limit value is set by using the vehicle speed as an parameter such that greater acceleration is allowed during lower vehicle speed as compared to during higher vehicle speed in the second aspect of the invention, a constant acceleration limit value may be determined when another aspect of the invention is implemented. Although the acceleration limit value of the second aspect of the invention may be changed only to two stages, for example, a high vehicle speed side and a low vehicle speed side, the acceleration limit value can be changed to three or more multiple stages or can be changed continuously depending on the vehicle speed.

Although acceleration running and deceleration running is alternately performed in the acceleration/deceleration running such that, for example, the vehicle speed is changed between predetermined upper and lower limit vehicle speeds, a higher vehicle speed makes a running resistance larger, resulting in larger deceleration, and if a vehicle speed width between the upper and lower limit vehicle speeds is constant, a repeated period of the acceleration running and the deceleration running becomes shorter on the higher vehicle speed side and a driver may feel uncomfortable. Therefore, it is desirable to increase the vehicle speed width between the upper and lower limit vehicle speeds on the higher vehicle speed side so as to make the repeated period of the acceleration running and the deceleration running substantially constant.

FIRST EXAMPLE

An example of the present invention will now be described in detail with reference to the drawings.

Figure 1:
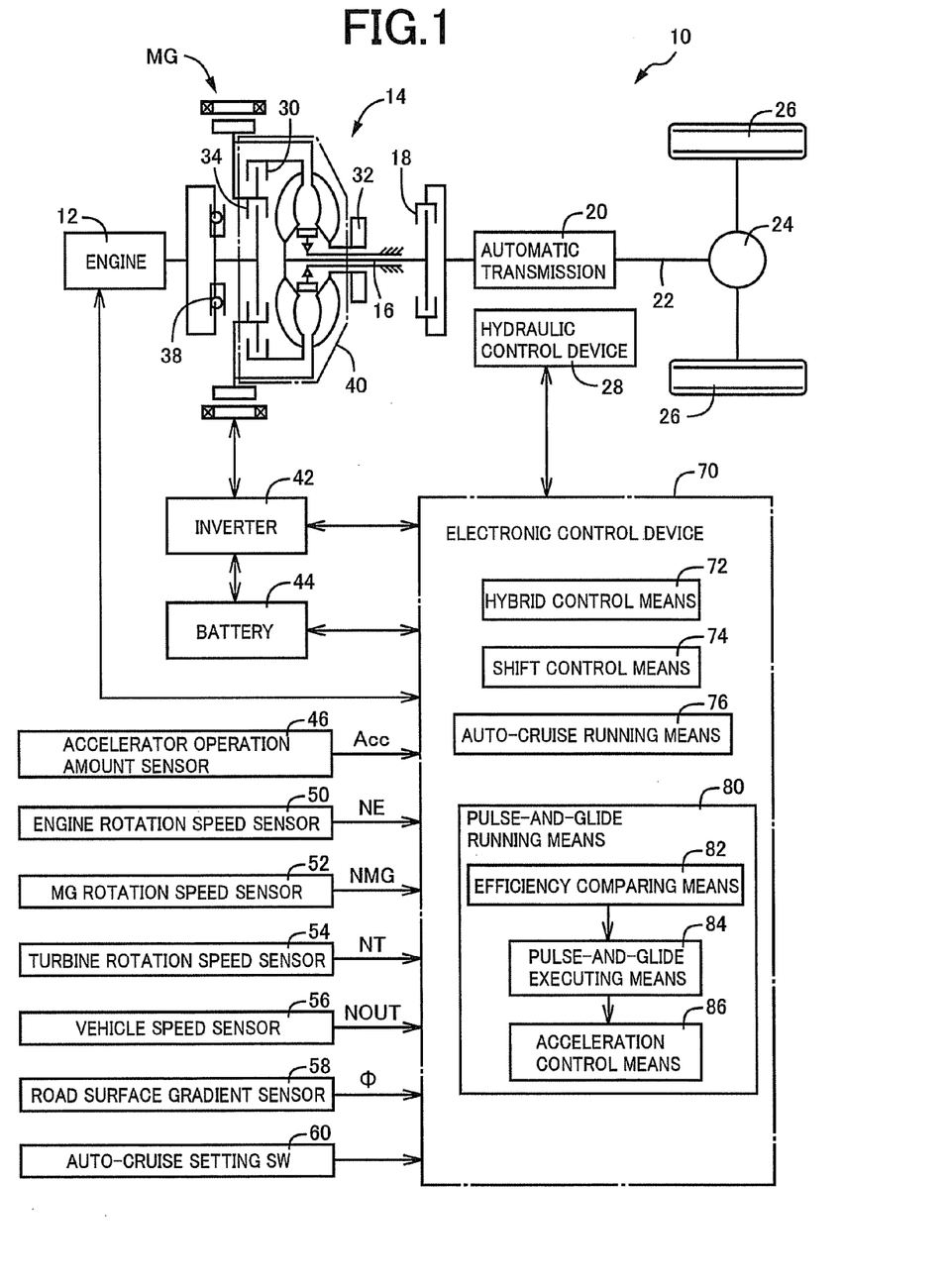
FIG. 1 is a conceptual configuration diagram of a schematic of a hybrid vehicle to which the present invention is preferably applied, including a major drive system thereof.

FIG. 1 is a conceptual configuration diagram including a schematic of a drive system of a hybrid vehicle 10 to which the present invention is preferably applied. The hybrid vehicle 10 includes as drive power sources an engine 12 that is an internal combustion engine such as a gasoline engine and a diesel engine generating power through combustion of fuel and a motor generator MG acting as an electric motor and an electric generator. An output of the engine 12 and the motor generator MG is transmitted from a torque converter 14 that is a hydraulic transmission device, via a turbine shaft 16 and a C1 clutch 18 to an automatic transmission 20 and is further transmitted via an output shaft 22 and a differential gear device 24 to left and right drive wheels 26. The torque converter 14 includes a lockup clutch (L/U clutch) 30 directly coupling a pump impeller and a turbine impeller and the pump impeller is integrally connected to an oil pump 32 and is mechanically rotationally driven by the engine 12 and the motor generator MG.

A K0 clutch 34 is disposed between, and directly couples, the engine 12 and the motor generator MG via a damper 38. The K0 clutch 34 is a single-plate or multi-plate friction clutch frictionally engaged by a hydraulic cylinder and is disposed in an oil bath condition within an oil chamber 40 of the torque converter 14 in terms of cost, durability, etc. The K0 clutch 34 is a hydraulic friction engagement device and acts as a connection/disconnection device connecting and disconnecting the engine 12 to/from a power transmission path. The motor generator MG is connected via an inverter 42 to a battery 44. The automatic transmission 20 is a stepped automatic transmission of planetary gear type etc., having a plurality of gear stages with different gear ratios established depending on engaged/released states of a plurality of hydraulic friction engagement devices (clutches and brakes) and is subjected to shift control by electromagnetic hydraulic control valves, switching valves, etc., disposed in a hydraulic control device 28. The C1 clutch 18 acts as an input clutch of the automatic transmission 20 and is subjected to engagement/release control by the hydraulic control device 28 in the same way.

The hybrid vehicle 10 as described above is controlled by an electronic control device 70. The electronic control device 70 includes a so-called microcomputer having a CPU, a ROM, a RAM, an I/O interface, etc., to execute signal processes in accordance with programs stored in advance in the ROM, while utilizing a temporary storage function of the RAM. The electronic control device 70 is supplied with a signal indicative of an operation amount of an accelerator pedal (accelerator operation amount) Acc from an accelerator operation amount sensor 46. The electronic control device 70 is also supplied with signals related to a rotation speed (engine rotation speed) NE of the engine 12, a rotation speed (MG rotation speed) NMG of the motor generator MG, a rotation speed (turbine rotation speed) NT of the turbine shaft 16, a rotation speed (output shaft rotation speed corresponding to vehicle speed V) NOUT of the output shaft 22, a road surface gradient ϕ, and setting of auto-cruise vehicle speed from an engine rotation speed sensor 50, an MG rotation speed sensor 52, a turbine rotation speed sensor 54, a vehicle speed sensor 56, a road surface gradient sensor 58, and an auto-cruise setting switch 60, respectively. Various pieces of information necessary for various controls are also supplied. The accelerator operation amount Acc corresponds to an output request amount.

The electronic control device 70 functionally includes a hybrid control means 72, a shift control means 74, an auto-cruise running means 76, and a pulse-and-glide running means 80. The hybrid control means 72 controls actuation of the engine 12 and the motor generator MG to switch a running mode among a plurality of predetermined running modes, such as an engine running mode using only the engine 12 as the drive power source for running, a motor running mode using only the motor generator MG as the drive power source for running, and an engine-plus-motor running mode using both for running, depending on an operation state such as the accelerator operation amount Acc and the vehicle speed V for running, for example. The shift control means 74 controls the electromagnetic hydraulic control valves, switching valves, etc., disposed in the hydraulic control device 28 to switch the engaged/released state of a plurality of the hydraulic friction engagement devices, thereby switching a plurality of the gear stages of the automatic transmission 20 in accordance with a shift map predetermined by using the operation state such as the accelerator operation amount Acc and the vehicle speed V as parameters. The auto-cruise running means 76 controls the output of the engine 12 and the motor generator MG such that the vehicle runs at a setting vehicle speed Vt set by the auto-cruise setting switch 60 and, if a leading vehicle running at a speed lower than the setting vehicle speed Vt is present, the output of the engine 12 and the motor generator MG is controlled such that the vehicle runs at a predetermined inter-vehicle distance from the leading vehicle.

The electronic control device 70 functionally includes the pulse-and-glide running means 80. The pulse-and-glide running means 80 is an acceleration/deceleration running means performing pulse-and-glide running by alternately repeating pulse running using the engine 12 as the drive power source and glide running with the engine 12 stopped between predetermined upper limit vehicle speed Vhi and lower limit vehicle speed Vlo for fuel efficiency improvement during running in the engine running mode using only the engine 12 as the drive power source for running, and functionally includes an efficiency comparing means 82, a pulse-and-glide executing means 84, and an acceleration control means

Figure 2:
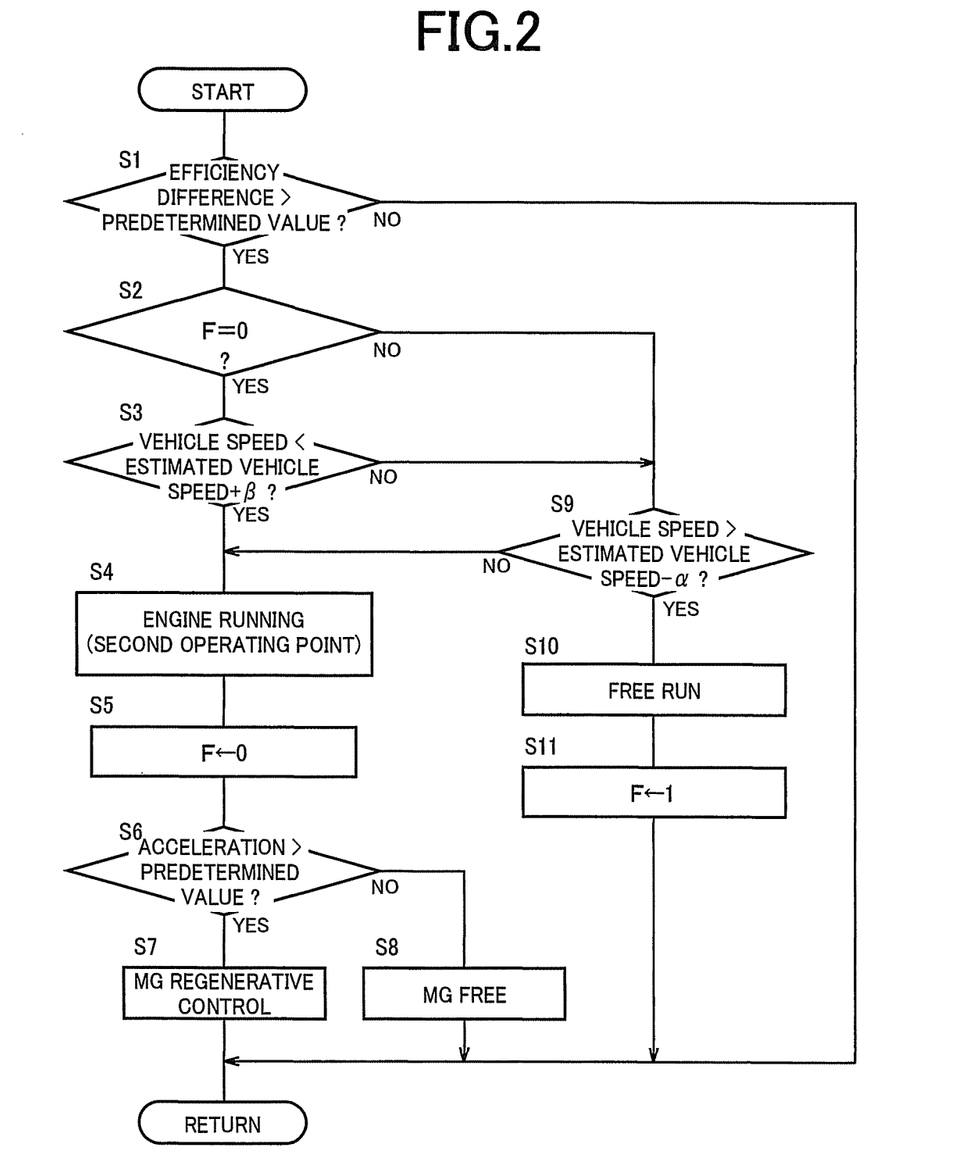
FIG. 2 is a flowchart for specifically explaining an operation of a pulse-and-glide running means functionally included in an electronic control device of FIG. 1.

86. FIG. 2 is a flowchart for specifically explaining an operation of the pulse-and-glide running means 80, including step S1 corresponding to the efficiency comparing means 82, steps S2 to S5 and S9 to S11 corresponding to the pulse-and-glide executing means 84, and steps S6 to S8 corresponding to the acceleration control means 86. The pulse-and-glide running corresponds to the acceleration/deceleration running and will hereinafter also simply be referred to as P&G running. During execution of the P&G running, the engine 12 corresponds to a motor and the motor generator MG corresponds to a rotating machine. The pulse running and the glide running correspond to acceleration running and deceleration running, respectively.

At step S1 of FIG. 2, a comparison is made between the efficiency η1 at a first operation point P1 related to the engine rotation speed NE and an engine torque during normal running while the engine 12 is operated depending on the accelerator operation amount Acc and the efficiency η2 at a second operation point P2 for a higher torque than the first operation point P1 and on an maximum efficiency line of the engine 12 stored in advance by using the engine rotation speed NE and the engine torque as parameters, so as to determine whether an efficiency difference Δη therebetween (=η2−η1) is greater than a predetermined positive execution determination value SR1. In this example, the engine rotation speeds NE at the first operation point P1 and the second operation point P2 are the same and determined depending on a gear ratio of the power transmission path including the automatic transmission 20 and the vehicle speed V, and the P&G running is performed without providing the shift control of the automatic transmission 20. During execution of the auto-cruise running by the auto-cruise running means 76, the first operation point P1 is set depending on an output request amount for running at the setting vehicle speed Vt. The execution determination value SR1 corresponds to a determination value of claim 1.

Figure 3A:
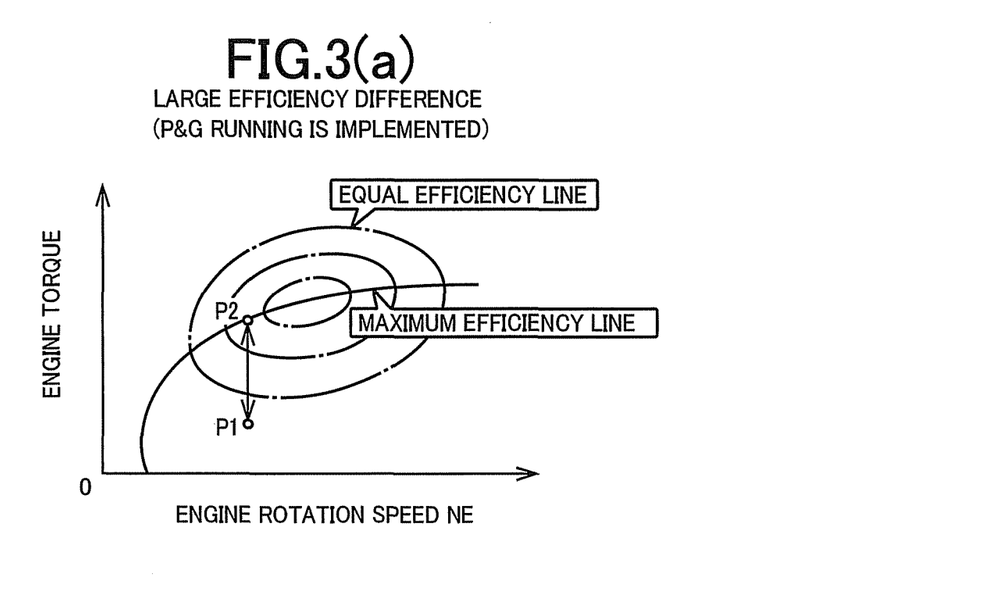
FIGS. 3 are graphs for explaining an engine efficiency when an efficiency difference is determined at step S1 of FIG. 2.
Figure 3B:
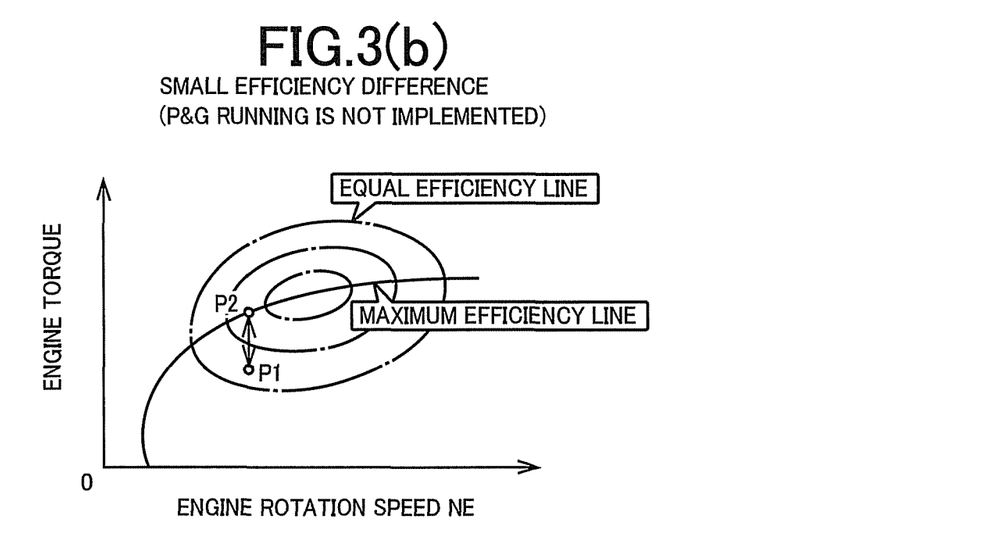

In the case of Δη>SR1, steps S2 and later are executed and, in the case of Δη≤SR1, the operation is directly terminated and the vehicle runs in the normal engine running mode with the engine 12 operated at the first operation point P1. Graphs of FIGS. 3(a) and 3(b) are examples of data maps of maximum efficiency lines (solid lines) and equal efficiency lines (dashed-dotted lines) of the engine 12 stored in advance by using the engine rotation speed NE and the engine torque as parameters, and, in the case of FIG. 3(a), a distance between the operation points P1 and P2 is relatively large, resulting in the efficiency difference Δη greater than the execution determination value SR1, and the P&G running from step S2 is performed. In the case of FIG. 3(b), a distance between the operation points P1 and P2 is relatively small, resulting in the efficiency difference Δη equal to or less than the execution determination value SR1, and the normal engine running mode is performed with the engine 12 operated at the first operation point P1.

The efficiency of the engine 12 is solely used in this example for the efficiencies η1 and η2, which are obtained from the data map of the equal efficiency lines indicated by the dashed-dotted lines of FIGS. 3(a) and 3(b). Therefore, a distance between the operation points P1 and P2 directly corresponds to the efficiency difference Δη. However, total efficiency including transmission efficiency of the power transmission path to the drive wheels 26 may be obtained in accordance with a predetermined computing equation etc., for comparison. Since the motor generator MG is subjected to regenerative control by excess engine output at step S7 to charge the battery 44 in this example, the efficiency η2 including a charge/discharge efficiency of the battery 44 may be obtained. The execution determination value SR1 may be determined in advance as a constant value or may be set by using the engine rotation speed NE etc., as a parameter. If the transmission efficiency of the power transmission path is substantially the same regardless of a difference of the operation points P1 and P2, the data maps of the maximum efficiency line and the equal efficiency line of the engine 12 depicted in FIGS. 3(a) and 3(b) are substantially coincident with an optimum fuel efficiency line of maximized fuel efficiency and an equal fuel efficiency line, respectively.

At step S2, it is determined whether a P&G switching flag F is zero and, in the case of F=0, the pulse running from step S3 is performed and, in the case of F=1, the glide running from step S9 is performed. The P&G switching flag F is set to zero in an initial state and when steps after step S2 are executed for the first time, i.e., at the start of the P&G running, steps S3 and later are executed. At step S3, it is determined whether the vehicle speed V is lower than the upper limit vehicle speed Vhi acquired by adding a predetermined speed width β to an estimated vehicle speed Ve and, during V<Vhi=Ve+β, steps S4 and later are executed and, if V≥Vhi=Ve+β is satisfied, steps S9 and later are executed. The estimated vehicle speed Ve is the vehicle speed V during running in the normal engine running mode without execution of the P&G running and is calculated based on an output request amount such as the accelerator operation amount Acc, a gear stage of the automatic transmission 20, running resistance (air resistance, rolling resistance, road surface gradient ϕ, acceleration resistance), etc. During execution of the auto-cruise running by the auto-cruise running means 76, the setting vehicle speed Vt can be used as the estimated vehicle speed Ve. The speed width β may be a constant value or may be set by using a running condition such as the vehicle speed V as a parameter.

When the P&G running is started, the vehicle speed V is substantially the same as the estimated vehicle speed Ve and, therefore, step S4 is executed. At step S4, the engine running is performed by operating the engine 12 at the second operation point P2. Since the second operation point P2 corresponds to a higher torque as compared to the first operation point P1 corresponding to the output request amount such as the accelerator operation amount Acc, the vehicle is normally accelerated. In this case, the engine output is transmitted toward the drive wheels 26 and, therefore, the K0 clutch 34 is retained in a connected state. Subsequently, at step S5, the P&G switching flag F is set to zero so that step S3 is executed after step S2 in the next execution of the program. At step S6, it is determined whether acceleration dV of the vehicle is greater than a predetermined acceleration limit value SR2 and, in the case of dV>SR2, the motor generator MG is subjected to the regenerative control at step S7 to charge the battery 44, thereby limiting the acceleration dV, while in the case of dV≤SR2, step S8 is executed to set the torque of the motor generator MG to zero for free rotation. In the case of dV>SR2, step 7 is executed each time the program is repeatedly executed with a predetermined cycle time, thereby limiting the acceleration dV to the acceleration limit value SR2 or less. Although the acceleration limit value SR2 may be a constant value, a driver generally becomes less sensitive to the acceleration dV at lower vehicle speed and, therefore, the acceleration limit value SR2 is set by a map etc., predetermined using the vehicle speed V as a parameter in this example such that the acceleration limit value SR2 continuously becomes larger at lower vehicle speed. A regenerative torque during the regenerative control at step S7 may be a constant value or may be increased depending on a difference (dV−SR2) between the acceleration dV and the acceleration limit value SR2.

The vehicle speed V is increased by repeatedly executing steps S4 and later and, when V≥Vhi=Ve+β is satisfied and the determination at step S3 becomes NO (negative), step S9 is executed. At step S9, it is determined whether the vehicle speed V is higher than the lower limit vehicle speed Vlo acquired by subtracting a predetermined speed width α from the estimated vehicle speed Ve and, during V>Vlo=Ve−α, steps S10 and later are executed and, if V≤Vlo=Ve−α is satisfied, steps S4 and later are executed. When the determination at step S3 becomes NO and step S9 is executed for the first time, V>Vlo=Ve−α is satisfied and, therefore, step 10 is executed after step S9 to stop the engine 12 and release the K0 clutch 34, disconnecting the engine 12 from the power transmission path, and the motor generator MG is set to zero torque for free rotation, thereby causing the vehicle to perform inertia running. Subsequently, at step S11, the P&G switching flag F is set to one so that steps S9 and later are executed after step S2 in the next execution of the program.

The speed width α may be a constant value or may be set by using a running condition such as the vehicle speed V as a parameter. A higher vehicle speed makes the running resistance larger, resulting in larger deceleration, and if a vehicle speed width (α+β) between the upper and lower limit vehicle speeds Vhi and Vlo is constant, a repeated period of the pulse running and the glide running becomes shorter on the higher vehicle speed side and a driver may feel uncomfortable and, therefore, the vehicle speed width α is made lager when the vehicle speed V is higher in this example such that the vehicle speed width (α+β) between the upper and lower limit vehicle speeds Vhi and Vlo is made larger on the higher vehicle speed side to make the repeated period of the pulse running and the glide running substantially constant. Instead of making the vehicle speed width α lager, the vehicle speed width β may be made lager or both the vehicle speed widths α and β may be made lager.

The vehicle speed V is decreased by repeatedly executing step 10 after step S9 and, when V≤Vlo=Ve−α is satisfied and the determination at step S9 becomes NO (negative), steps S4 and later are executed again and the vehicle is accelerated by the pulse running. By repeatedly executing the pulse running of step S4 and the glide running of step S10, the acceleration/deceleration running is performed, repeating acceleration/deceleration between the upper and lower limit vehicle speeds Vhi and Vlo.

Figure 4A:
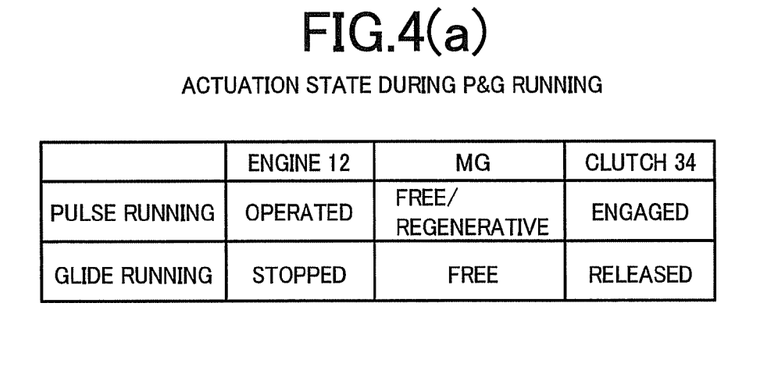
FIG. 4(a) is a diagram illustrated by comparison between actuation states of the portions during pulse running and during glide running.
Figure 4B:
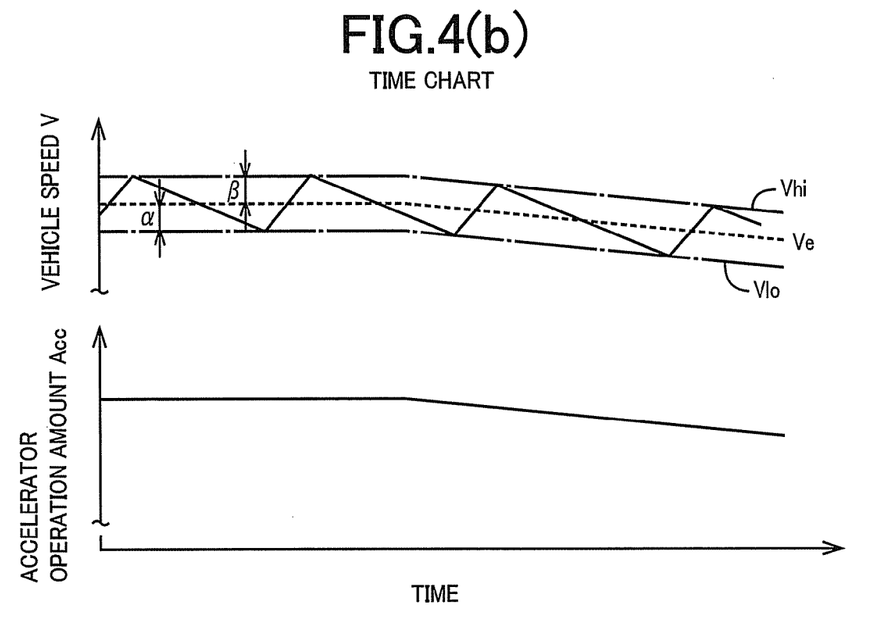
FIG. 4(b) depicts an example of a time chart representative of changes in the vehicle speed and an accelerator operation amount.

FIG. 4 is a diagram for generally explaining the P&G running executed by the pulse-and-glide running means 80 in accordance with the flowchart of FIG. 2, and FIG. 4(a) is a diagram of comparison between actuation states of the portions during the pulse running and during the glide running. FIG. 4(b) depicts an example of a time chart representative of changes in the vehicle speed V and the accelerator operation amount Acc during the P&G running in the case of gradual deceleration due to a returning operation from a steady running state with a substantially constant accelerator operation amount Acc, and the vehicle runs while repeating acceleration and deceleration between the upper limit vehicle speed Vhi and the lower limit vehicle speed Vlo determined higher and lower than the estimated vehicle speed Ve.

In the hybrid vehicle 10 of this example, a comparison is made between the efficiency η1 at the first operation point P1 during the normal running while the engine 12 is operated depending on an output request amount such as the accelerator operation amount Acc and the efficiency η2 at the second operation point P2 for outputting a higher torque than the first operation point P1 and, if the difference Δη (=η2−η1) of these efficiencies is greater than the predetermined execution determination value SR1, the P&G running is implemented such that the pulse running is performed at the second operation point P2 and, therefore, by suitably determining the execution determination value SR1, the fuel efficiency can more certainly be improved through the implementation of the P&G running.

Since the engine 12 is operated at the second operation point P2 set on the maximum efficiency line to perform the pulse running in this example, the efficiency difference Δη between the first operation point P1 and the second operation point P2 is maximized, increasing the frequency of implementation of the P&G running, and the excellent fuel efficiency improvement effect is acquired through the implementation of the P&G running.

In this example, if the acceleration dV during the pulse running in execution of the P&G running becomes larger than the predetermined acceleration limit value SR2, the motor generator MG generates electricity to charge the battery 44 so that the acceleration dV is limited to the acceleration limit value SR2 or less and, therefore, while a driver is prevented from feeling uncomfortable due to larger acceleration dV, the battery 44 can be charged with excess engine output to maintain the fuel efficiency improvement effect. In other words, although the second operation point P2 can be set such that the vehicle is accelerated at the predetermined acceleration dV during the pulse running, if the engine 12 is operated with the second operation point P2 set on the maximum efficiency line as in this example, the acceleration dV is likely to be larger than necessary and makes a driver feel uncomfortable and, therefore, in this case, the motor generator MG generates electricity to charge the battery 44, thereby achieving both the prevention of the driver's uncomfortable feeling and the fuel efficiency improvement.

In this example, the acceleration limit value SR2 is set by using the vehicle speed V as a parameter such that the acceleration limit value SR2 continuously becomes larger at lower vehicle speed so as to allow larger acceleration dV during lower vehicle speed as compared to during higher vehicle speed and, therefore, while a driver is prevented from feeling uncomfortable due to larger acceleration dV, an energy loss due to battery charge is suppressed, resulting in further improvement in the fuel efficiency. In other words, since the driver generally becomes less sensitive to the acceleration dV at lower vehicle speed as compared to higher vehicle speed, the driver is less likely to feel uncomfortable even if the acceleration dV is made larger during lower vehicle speed and, when higher acceleration is allowed, an energy loss generated during charging/discharging of the battery 44 is reduced and the energy can be more efficiently and effectively utilized.

Although the examples of the present invention have been described in detail with reference to the drawings, these examples are merely an embodiment and the present invention may be implemented in variously modified and improved forms based on the knowledge of those skilled in the art.

NOMENCLATURE OF ELEMENTS

10: hybrid vehicle 12: engine (motor) 44: battery 70: electronic control device 80: pulse-and-glide running means 82: efficiency comparing means 84: pulse-and-glide executing means 86: acceleration control means MG: motor generator (rotating machine) Acc: accelerator operation amount (output request amount) P1: first operation point P2: second operation point

The invention claimed is:

1. A control device for a vehicle that includes (a) an internal combustion engine and (b) a rotating machine disposed in a power transmission path between the internal combustion engine and wheels of the vehicle, the vehicle being configured to perform acceleration/deceleration running by alternately repeating acceleration running by operation of the internal combustion engine and deceleration running by stopping of the internal combustion engine or interruption of power transmission from the internal combustion engine, wherein the control device is programmed to make a comparison between (i) an efficiency of the internal combustion engine at a first operation point determined by a rotation speed and a torque of the internal combustion engine during normal running during which the internal combustion engine is operated depending on an output request amount and (ii) an efficiency of the internal combustion engine at a second operation point for outputting a higher torque than the first operation point, the second operation point lying on a maximum efficiency line which represents combinations of values of the rotation speed and the torque of the internal combustion engine and which is stored in the control device, the control device is programmed, when a difference between the efficiencies is greater than a predetermined determination value, to cause the vehicle to alternately repeat the acceleration running and the deceleration running such that the acceleration running is performed with operation of the internal combustion engine at the second operation point, and the control device is programmed, when acceleration during the acceleration running becomes larger than a predetermined acceleration limit value, to cause the rotating machine to generate electricity to charge a battery of the vehicle, while causing the vehicle to alternately repeat the acceleration running and the deceleration running with the acceleration running being performed with the operation of the internal combustion engine at the second operation point.

2. The vehicle drive control device of claim 1, wherein the acceleration limit value is set by using a vehicle speed as a parameter so as to allow larger acceleration during lower vehicle speed as compared to during higher vehicle speed.

3. The vehicle drive control device of claim 1, wherein the control device is programmed, when the acceleration running becomes not larger than the predetermined acceleration limit value, to set a torque of the rotating machine to substantially zero so as to allow the rotating machine to be freely rotated.

4. The control device of claim 1, wherein the control device is programmed, when causing the rotating machine to generate the electricity to charge the battery of the vehicle, to control a regenerative torque of the rotating machine such that the acceleration during the acceleration running becomes equal to or less than the acceleration limit value.

5. The control device of claim 1,
wherein the control device is programmed to determine whether the vehicle is to be caused to perform the normal running with the operation of the internal combustion engine at the first operation point or is to be caused to alternately repeat the acceleration running and the deceleration running with the acceleration running being performed with the operation of the internal combustion engine at the second operation point, based on the difference between the efficiency of the internal combustion engine at the first operation point and the efficiency of the internal combustion engine at the second operation point, and wherein the control device is programmed, when the difference between the efficiencies is not greater than the predetermined determination value, to cause the vehicle to perform the normal running with the operation of the internal combustion engine at the first operation point, and the control device is programmed, when the difference between the efficiencies is greater than the predetermined determination value, to cause the vehicle to alternately repeat the acceleration running and the deceleration running with the acceleration running being performed with the operation of the internal combustion engine at the second operation point.

6. The control device of claim 2, wherein the acceleration limit value is an upper limit value to which the acceleration during the acceleration running is allowed to be increased.

7. The control device of claim 4, wherein the acceleration limit value is an upper limit value to which the acceleration during the acceleration running is allowed to be increased.

8. The control device of claim 5, wherein the normal running is a running performed without execution of the acceleration/deceleration running.

9. The control device of claim 2, wherein the acceleration limit value is an upper limit value such that the acceleration during the acceleration running is limited to the upper limit value or less.

10. The control device of claim 4, wherein the acceleration limit value is an upper limit value such that the acceleration during the acceleration running is limited to the upper limit value or less.

* * * * *